United States Patent Office 3,203,171
Patented Aug. 31, 1965

3,203,171
NEW MISSILE FUEL COMPOSITIONS CONTAINING HALOGENS AND METHOD OF PROPULSION
Oliver Wallis Burke, Jr., 1238 Berkshire Road, Grosse Pointe Park, Pauls Davis, Mount Clemens, and Urs F. Nager, Royal Oak, Mich.; said Davis and Nager assignors to said Burke
No Drawing. Filed Dec. 18, 1958, Ser. No. 781,217
9 Claims. (Cl. 60—35.4)

This invention realtes to fuels and the production thereof, and aims generally to improve the same.

Particuarly, but not exclusively, the invention is concerned with the production of improved high energy fuels and fuel combinations adaptable for use for jet propulsion, gas turbine engines, rocket propulsion, missile propulsion, torpedo propulsion, assisted take-off for aircraft and other uses for which high energy fuels are employed or sought.

It is known in the art that metals and organo-metallic compounds can be burned by oxygen or oxygen liberating materials. However such fuel combinations have the disadvantage that the metal oxides formed usually have extremely high boiling points, tend to build up in the burner structure or in other structures through which the products of combustion are discharged, and do not contribute greatly to the thrust produced by the combustion.

The present invention seeks to produce fuel compositions which reduce or preferably eliminate the formation of metal oxides and enable control of the formation of solid and/or liquid products of combustion, and which have further advantages as will hereinafter appear. In this connection the present invention provides fuel combinations employing fluorine donor materials and fluorine acceptor metallo-materials, at least one of which is organic, as hereinafter more particularly described. It has heretofore been known that fused alkali metals will attack perfluorocarbons at 200° C. The present invention has discosed, inter alia, that dispersions of alkali metals may be combined with fluorocarbons to form a fuel mass, and that when such mass is locally rapidly heated, as by a glowing resistance wire, it will ignite and undergo rapid combustion as a fuel system; and conversely that metal organic fluorine acceptor materials may be combined with inorganic and/or organic fluorine donor materials to form fuels ranging from those undergoing spontaneous ignition to those requiring elevated temperatures for ignition, and it will of course be understood that while the various embodiments of the present invention constitute a true genus the several sub-groups and species thereof have individual and unpredictable characteristics and advantages, and hence are not to be considered mere equivalents of one another.

Thus for the purpose of attaining various ones of the foregoing objects and advantages, the present invention (I) new fuel combinations comprising at least one fluorine donor material as hereinafter defined, and at least one metallo-fluorine acceptor material as hereinafter defined, at least one of said materials being an organo-compound, and (II) new fuel combinations comprising the combination, with a new fuel combination of group (I) above, of an oxygen containing oxidant as hereinafter defined, preferably in a quantity sufficient to combine with at least a part or all of the carbon, or hydrogen and carbon, liberated by reaction of the materials of the group (I) composition.

The invention resides in the new features and combinations herein disclosed and is more particularly defined in the appended claims.

DEFINITIONS

As used herein:
I. The term "Fluorine Donor Material" embraces (a) "inorganic" fluorine donor materials including (1) those not containing oxygen, e.g. fluorine and the fluorine containing mixed halogens and (2) those containing oxygen e.g. oxides of fluorine and oxides of fluorine-containing mixed halogens; (b) the "organo-fluorine" donor materials including (1) the nonpolymeric organic compounds containing fluorine and (2) the polymeric materials containing fluorine. For further details see the materials as set out under this Class I and its subclasses hereinafter.

II. The term "Fluorine Acceptor Metallo-Material" embraces (a) "inorganic" fluorine acceptor material including (1) metals per se, (2) metal-nitrogen containing compounds and (3) metal hydrides including (i) liquid metal hydrides and (ii) solid metal hydrides; (b) "organic" fluorine acceptor materials including (1) liquid organo-metallic compounds and (2) solid organo-metallic compounds including (i) mono-metallated organo-metallic compounds and (ii) multiply metallated organo-metallic compounds and these being (ii–a) non-polymeric and (ii–b) polymeric. For further details see the materials as set out under this Class II and its subclasses hereinafter.

III. The term "Oxygen Containing Oxidant" as used herein embraces oxidants capable of supplying oxygen to combustables and includes (a) "liquid" or liquifiable oxidants e.g. oxygen, ozone, hydrogen peroxide, the oxyhalides and the nitrogen oxides and (b) the "solid" oxidants e.g. the ammonium and metal salts of the peroxy acids and the acids derived from the nitrogen oxides. For further details see the materials as set forth under this Class III and its subclasses hereafter.

GENERAL DESCRIPTION

The new fuels provided, in the broader aspects of the invention, embrace fuels which are self-igniting on combination of the components thereof and fuels which are stable despite such combination until at least a local portion thereof is raised to a suitable ignition temperature. They embrace fuel combinations in which the components are stored in liquid form, in liquid and solid forms, and in solid forms, and it will be appreciated that in many instances one or more of the components, e.g. fluorine, gaseous low fluoro-carbons, oxygens, etc., may actually come into initial contact with the other components in gaseous state.

In certain embodiments of the invention the new fuel combinations have relatively high ignition temperatures, rendering them safe to handle under normal conditions and rendering them capable of maintaining burning rates advantageous in the contemplated uses thereof.

The above characteristics of fuel combinations according to this invention will be made apparent by the examples hereinafter set forth, which for clarity and simplicity have been converted for presentation herein on a molar basis, it being of course understood that one skilled in the art may readily calculate the weight proportions employed for the particular combination therein.

In the examples in which metal per se is employed, such metal may be incorporated in attenuated form, i.e. as powder or in any form in which it presents an adequate ratio of exposed surface to volume, and in those embodiments of the invention employing metal per se in which the ignition temperature is elevated as aforesaid, the metal acceptor and the fluorine donor, with or without oxygen containing oxidant, may be intimately associated in advance of ignition. Of course in those embodiments in which ignition is spontaneous, the components must be separately stored and be admixed only at the situs of combustion.

For succinctness, Examples 1–177 hereinafter set forth have been tabulated, on a molar basis as above noted, in the broad categories (I) and (II) above designated, and in accordance with the group characteristics generally indicated above, from which the characteristics and advantages common to various species may be readily appreciated, it being of course understood that these examples are illustrative, and not restrictive, of this invention.

Also for succinctness, in the examples employing oxygen containing oxidants for combination with carbon, or hydrogen and carbon, freed by reaction of the fluorine donor material and the fluorine acceptor metallomaterial, the matters common to tabulated Examples 1–177 have been set forth by reference thereto, generally, with details only of typical examples.

I. *Fluorine donor materials*

The fluorine donor materials employed in the present invention, as above indicated, fall into two categories (a) the inorganic fluorine donor materials and (b) the organo-fluorine donor materials. The first category falls into two groups, namely (1) those not containing oxygen, and (2) those containing oxygen; and the second category also falls into two groups, namely (1) the non-polymeric groups, and (2) the polymeric groups. The materials comprised in each of these categories and groups may be exemplified as follows:

(a) INORGANIC FLUORINE DONOR MATERIALS (GENERALLY LIQUIDS OR LIQUIFIABLE GASES (1) The inorganic fluorine donor materials not containing oxygen include, e.g. fluorine per se, chlorine trifluoride, bromine pentafluoride, bromine trifluoride, iodine heptafluoride, chlorine mono-fluoride, etc., of which the first three are usually preferred. (2) The inorganic fluorine donor materials containing oxygen include, e.g. fluorine oxide (oxygen difluoride), dioxygen difluoride, fluorine chlorate, fluorine perchlorate, nitrosyl fluoride, etc., of which the oxygen difluoride is usually preferred.

(b) ORGANIC FLUORINE DONOR MATERIALS (1) The non-polymeric organic fluorine donor materials (usually liquids or liquifiable gases) embrace the aliphatic fluorine compounds and aromatic fluorine compounds including those containing fluorine and carbon with or without hydrogen and/or nitrogen and/or oxygen, a number of which are set out in the chemical literature as for example those aliphatic fluorine compounds set forth in the treatise by A. M. Lovelace, W. Postelnek and D. A. Raurch, entitled "Aliphatic Fluorine Compounds," published in 1958 by Reinhold Publishing Corporation, New York, New York, and those aliphatic and aromatic fluorine compounds set forth in the 2nd volume of the treatise edited by J. H. Simons, entitled "Fluorine Chemistry," published in 1950 by the Academic Press, Inc., New York, New York.

For the purposes of this invention oxygen and/or nitrogen containing fluorine aliphatic and aromatic compounds, and those high in hydrogen, are less desirable where maximum energy output is required. The fluorocarbon compounds may contain other halogen atoms such as chlorine, bromine, and iodine, preferably in minor proportion to the fluorine content thereof. The effect of hydrogen, bromine and iodine substituents and sometimes of chlorine substituents is to reduce the ignition temperature, especially in the case of bromine and iodine, which may be desirable in certain instances. Therefore, the preferred fluoro compounds are the perfluoro compounds especially of the aliphatic series including the alkanes, alkenes and alkynes with preferably no more than half of the fluorines substituted by hydrogen and/or halogens other than fluorine, that is, chlorine, bromine or iodine. Most of the $C_1$ to $C_4$ fluorocarbons especially the perfluorocarbons and those fluorocarbons with hydrogen and/or halogen other than fluorine substituents as above set out, are gases at room temperature and must be compressed to the lquid state, and these include the "Genetrons" (trademark products of the General Chemical Division of Allied Chemical and Dye Corporation), and the Freons (trademarked products of E. I. du Pont de Nemours Co.), including Genetron 13 (monochlorotrifluoromethane), Genetron 1113 (trifluorochloroethane), Genetron 1132 (vinylidene fluoride), Genetron 1112 or Freon 12 (dichlorodifluoroethylene), and others such as the perfluoromethane, ethane, propane, butane and pentane and the mono or dihalogen substituted—including chloro, bromo, and iodo substituted—and/or mono or di-hydrogen substituted derivatives of these perfluoro $C_1$ to $C_5$ compounds.

Where liquids are to be employed without pressure, the $C_5$ to $C_{20}$ and higher perfluoro alkanes, alkenes and alkynes are preferred, or the mono or di halo other than fluorine and/or hydrogen substituted derivates of these perfluorinated $C_5$ to $C_{20}$ hydrocarbons.

Among the nitrogen and oxygen containing non-polymeric organo-fluorine materials are such compounds as trifluoromethyl hypofluorite ($CF_3OF$), the trifluoronitrosomethane ($CF_3NO$), the partially and completely fluorinated esters including those of acrylic and methacrylic acids, etc.

(2) The polymeric organic donor materials (usually solids including elastic and plastic solids, in some instances liquids) include polymers, copolymers (including graft copolymers), and mixed polymers which are partially or completely fluorinated with or without hydrogen, other halogen, nitrogen and/or oxygen substituents. Such polymers include at least partially fluorinated polyesters, polyamides, polyurethanes and the polymers produced by carbon-to-carbon unsaturated bond polymerization including the at least partially fluorinated vinyls, vinylidenes, allyls, dienes (including conjugated dienes) and the like; polymers containing partially or completely fluorinated carbon segments; the symmetrical triazine structure; the perfluoro-glutaroamidine and perfluoroadipodiamidine copolymers of H. C. Brown and the like; the fluoro and perfluoro phosphinic nitride polymers; the fluorosiloxane polymers; polymers and copolymers of fluorinated and partially fluorinated aldehydes e.g., $CF_3CHO$, and fluorinated or partially fluorinated nitroso compounds e.g., $CF_3NO$, and copolymers of these with fluorinated and partially fluorinated olefins, vinyl ethers, etc., e.g., tetra-fluoroethylene, trifluorochloroethylene, perfluoropropylene, etc. The fluorine containing monomers from which the polymers included herein are prepared include vinyl fluoride, vinylidene fluoride, 1,1,difluoroethylene, trifluorochloroethylene, trifluorobromoethylene, difluorodichloroethylene, difluorodibromoethylene, the fluorodichloro ethylenes, the fluorodibromoethylenes, fluorotrichloroethylenes, fluorotribromoethylenes, the partially and completely fluorinated polymerizable olefins e.g., perfluoropropylene; the mixed fluorochloro, fluorobromo, and fluorochlorobromo partially and completely halogenated apha-olefins such as propylene, the butylene and isobutylene series and polymerizable higher α olefins, and further including partially or completely halogenated polymerizable vinyl monomer material including the fluoro, fluorochloro, fluorobromo and fluorochlorobromo partially or completely substituted styrene, vinyl toluenes, acrylates, methacrylates, vinyl ethers, vinyl ketones, and the partially or completely fluoro-halogenated polymerizable conjugated and non-conjugated dienes. The polymers from halogenated monomers having a high content of fluorine are preferred for the purposes of this invention, and such polymers include but are not limited to: tetrafluoroethylene polymers; copolymers of tetrafluoroethylene with such monomers as trifluorochloroethylene, trifluorobromoethylene, trifluoroethylene, vinylidene and vinyl-fluorides, chlorides and bromides; hexafluoropropylene and the like and mixtures of these: the trifluorochloroethylene polymers; copolymers of trifluorochloroethylene with other monomers such as those set forth just above as employable with perfluoroethylene; the polymers from the partially and completely fluorinated acrylates and substituted acrylates such as perfluoroethyl acrylate, 1,1-dihydroperfluorobutyl acrylates and the like; the partially or completely fluoro-halogenated esters of polycarboxylic acids and polyalcohols such as the fluoro-halogenated condensates of adipic acid with glycols, and the like. Many commerical designations are given for the fluorine containing polymers useful herein such as the "Teflon" polymers of Du Pont de Nemours and Company, including Teflon, Teflon-1, Teflon 100–X etc.; the "Viton" polymers also of du Pont de Nemours and Company, including Viton A, Viton AHV, etc.; the "Kel-F" polymers of the Minnesota Mining and Manufacturing Company, including the Kel-F and Kel-F800; and the "Fluorolubes" (polymers of trifluorovinylchloride) of the Hooker Electrochemical Company including Fluorolube FS, S, HO, LG; etc. The "Kel–F" polymers are resinous polytrifluorochloroethylenes used for molding and dispersions and have molecular weights in excess of 300,000; the "Fluorolubes" are lower molecular weight liquid polytrifluorochloroethylenes (Modern Plastics Encyclopedia, 1960, page 104). In employing the fluorine containing polymers such may be used singly or in combination and with or without other non-fluorinated organic polymer material in intimate dispersion therewith. The fluorinated polymers, especially the highly fluorinated polymers, are not compatible with non-fluorinated polymers and can only be combined with such by hetrogeneous intermixing.

II. *Fluorine acceptor metallo-materials*

The fluorine acceptor metallo-materials employed in the present invention, as above indicated, fall into two categories, i.e., (*a*) inorganic and (*b*) organic.

The first category (*a*) falls into three groups (1) the metals including metals per se, mixtures thereof, and alloys—generally solids, (2) the metal nitrogen compounds including metal amides, certain metal nitrides, metal azides, etc.—generally solids, (3) the metal hydrides including mono-metal and mixed metal hydrides, which in turn fall into two sub-groups (i) those which are liquids or liquifiable gases and (ii) those which are solids.

The second category (*b*) falls into two groups (1) those organo-metallic compounds which are liquids or liquifiable gases and, (2) those which are solids, the latter in turn falling into two sub-groups (*a*) the mono-metallated solid organo-metallic compounds and (*b*) the multiply metallated organo-metallic compounds. This last category includes (1) non-polymeric and (2) polymeric multiply metallated materials.

The materials composed in each of these categories, groups, and sub-groups may be exemplified as follows:

(*a*) INORGANIC FLUORINE ACCEPTOR METALLO-MATERIALS (1) The metallic fluorine acceptor materials include from group I of the periodic table in order of preference, lithium, sodium and potassium; from group II, in order of preference, magnesium, beryllium, calcium, zinc, strontium and cadmium; from group III in order of preference, aluminum and boron; from group IV, in order of preference, titanium, tin and zirconium; from group V of the periodic table, vanadium, antimony, and columbium, and combinations of the foregoing including mixtures and alloys with or without other metals in minor proportions as dictated by economic and other factors, and with and without minor proprotions of non-metallic elements such as carbon.

(2) The metal-nitrogen fluorine acceptor materials include: the nitrides, amides and azides of lithium, sodium and potassium, etc., and borazole.

(3) The metal hydride fluorine acceptors include (i) liquid or liquifiable metal hydrides, e.g., diborane, pentaborane, aluminum borohydride and borazole and (ii) solid metal hydrides, e.g., lithium, sodium and potassium hydrides and such alkali metal-aluminum hydrides, and such alkali metal-borohydrides and diboranes, beryllium borohydrides, aluminum borohydrides and decaborane.

(*b*) FLUORINE ACCEPTOR ORGANO-METALLIC MATERIALS (1) The liquid fluorine acceptor organo-metallic materials include the alkyl, alkenyl and alkynyl, aryl alkaryl, aralkyl and cyclohydrocarbon liquid lithium, beryllium, zinc, cadmium, boron and aluminum compounds and combinations of these when liquid. Included hereunder are e.g., lithium n-propyl, isopropyl, n-butyl, isobutyl, n-amyl, isoamyl and the higher liquid lithium alkyls; beryllium diethyl, di-n-propyl, di-iso-propyl, di-n-butyl, di-iso-butyl, di-n-amyl, di-iso-amyl and the higher liquid beryllium alkyls; zinc dimethyl, diethyl, di-n-propyl, di-iso-propyl, di-n-butyl, di-iso-butyl, di-n-amyl, di-iso-amyl and the higher liquid zinc alkyls; cadmium dimethyl, diethyl, di-n-propyl, di-iso-propyl, di-n-butyl, di-iso-butyl, di-n-amyl, di-iso-amyl and the higher liquid cadmium alkyls; boron trimethyl, triethyl, tri-n-propyl, tri-iso-propyl, tri-n-butyl, tri-iso-butyl, tri-n-amyl, tri-iso-amyl and the higher liquid boron alkyls; aluminum trimethyl, triethyl, tri-n-propyl, tri-iso-propyl, tri-n-butyl, tri-iso-butyl, tri-n-amyl, tri-iso-amyl and the higher liquid aluminum alkyls and combinations of these compounds when liquid.

(2) Solid fluorine acceptor organo-metallic materials include (i) the mono-metallated organo-metallic compounds, i.e., those in which only a single metal group is bound in the compound through a metal to carbon bond or a metal-nitrogen carbon bond, e.g., the solid alkyl, alkenyl, alkynyl, aryl, alkaryl, aralkyl and cyclohydrocarbons of lithium, sodium, potassium, beryllium, magnesium, boron; and lithium-aluminum alkyl compounds. Included hereunder are: compounds such as lithium methyl, lithium phenyl and other solid lithium hydrocarbons; the sodium and potassium methyl, ethyl, n-propyl, isopropyl, n-butyl, isobutyl, phenyl and other such solid sodium and potassium alkyls, alkenyls, alkynyls, and cyclic hydrocarbons; alkali metal acetylides; beryllium dimethyl, magnesium diethyl, di-n-propyl, di-iso-propyl, di-n-butyl, di-iso-butyl, di-n-amyl, di-iso-amyl and higher solid magnesium alkyls; the solid addition products of lithium, sodium and potassium alkyls with aluminum alkyls, e.g., lithium tetramethylaluminate, sodium tetraethylaluminate, etc., and (ii) the multiply metallated organo-metallic acceptors include those compounds with two or more metal groups such metal groups having a metal to carbon bond or a metal-nitrogen-carbon bond and these in turn can be divided into (*a*) non-polymeric and (*b*) polymeric.

In the first category (*a*) are included compounds like disodium p-xylene, disodium tetraphenylethane, disodium dibenzfuram, and disodium, acetylide, as well as the B-alkylborazoles obtained by reacting the alkyl diboranes or the trialkylborons with ammonia, the N-alkyl borazoles obtained by reacting diborane and a primary alkylamine, and the fully substituted B-alkyl, N-alkylborazoles prepared by reacting a trialkyl boron with a primary alkyl amine, e.g., B-trimethylborazole, B-triethylborazole, B-tripropylborazole, N-trimethylborazole, N-triethylborazole, N - tripropylborazole, hexamethylborazole, hexaethylborazole, hexapropylborazole, N-trimethyl-B-triethylborazole, N-triethyl-B-trimethylborazole; and the like.

In the second category (*b*) are included compounds like trisodium α-methyl styrene trimer, and multiply sodium metallated natural rubber. The mono-, di-, and tri-vinyl or allyl borazoles if homopolymerized or copolymerized with other polymerizable monomers are contemplated as within this class.

For further examples of mono-metallated organo-metallic compounds and of multiply metallated organo-metallic compounds of lithium, sodium, potassium, beryllium, magnesium, zinc cadmium, boron and aluminum see catalyst component (1) as set forth in patents and applications of Oliver Burke, Jr., and Oskar Klopfer as follows: U.S. application No. 580,642, filed April 25, 1956; U.S. application No. 697,743, November 6, 1957; Belgium Patent No. 556,978, filed April 25, 1957; Italian Patent No. 570,968, filed April 23, 1957, and South African Patent No. 1,323 (1957); and U.S. application No. 775,133, filed November 19, 1958.

III. Oxygen containing oxidant

The oxygen containing oxidants fall into two groups (a) liquid or liquifiable oxidants and (b) solid oxidants.

(a) The liquid or liquifiable oxidants include liquid oxygen, ozone, 90% or higher hydrogen peroxide, the oxyhalides other than those containing fluorine, chlorine oxide ($Cl_2O$) etc.; the liquid or liquifiable nitrogen oxides including nitrogen tetroxide and stabilized red fuming nitric acid (contains about 20% oxides of nitrogen calculated as $NO_2$).

(b) The solid oxidants include the metal salts especially the lithium, sodium, potassium and ammonium salts of the per-oxy-acids such as the percarbonates, perborates and perchlorates, the peroxides of the foregoing metals, and the ammonium and metal salts of the acids derived from nitrogen oxides, e.g., the alkali metal nitrates and ammonium nitrate.

IV. Materials handling

As above indicated, the fuel combinations contemplated in the broader aspects of the present invention include those in which the fluorine donor material and the fluorine acceptor metallo-material are both handled as liquids or liquified gases (and in which practically all the combinations are self-igniting at normal temperatures), those in which one of them is handled as a liquid or liquified gas and the other as a solid, which term also includes non-pumpable viscous liquids, elastomers and plastomers (and in which the various combinations may or may not be self-igniting at normal temperatures) and those in which both of them are handled as solids (in which many of the combinations do not undergo reaction or ignition until raised to elevated temperatures, giving them the special utility that the materials may be precombined).

Likewise as above indicated the oxygen containing oxidants broadly include those which are handled as a pumpable liquid, and those which are handled as a solid. Usually when the fluorine-donor and fluorine acceptor are handled as liquids and an oxygen containing oxidant is also used, it is generally desirable to employ a liquid oxidant, when one of them is a solid, either form of oxidant may be used, as desired, and when both of them are solids, the solid oxidant is generally preferred, but the non-preferred form of course is not excluded in either case.

In solid-liquid systems which ignite only at elevated temperatures, the components may be combined to form a paste or the like and be suitably fabricated into charges.

Similarly, in many instances the solid-solid systems which ignite only at elevated temperatures can be premixed with or without vulcanizing agents, and be fabricated into charges.

In solid-solid systems which ignite only at elevated temperatures, and in which the fluorine donor compound is a polymer, and especially after combination with the solid fluorine acceptor, with or without solid oxidant, such combinations can be vulcanized in known manner with the aid of known vulcanization agents for fluorocarbon polymers which include metal-oxides and in some instances carbonates, and especially organic mono- and poly-amines.

Combinations of the systems set forth herein can also be employed. It is often advantageous to combine liquid and solid organo-fluorine compounds. It is likewise frequently desirable to combine different fluorine acceptors, especially the metals, metal hydrides and metal nitrogen compounds as set forth above.

Furthermore, a liquid organo-fluorine component in some instances may be employed as a plasticiser for a solid organo-fluorine component to facilitate the forming of such into charges.

It is to be understood that minor proportions of non-fluorinated compounds including polymers as binders can be added to the fuel combinations without departing from the essence of the invention. Where accelerated burning rates are desired, catalyst materials in minor amounts may be added, such as metal salts including salts and complexes with organo-oxygen, nitrogen and sulfur compounds of the transition elements, and in some instances small quantities of organo-silicon compounds such as the organo siloxanes are useful catalysts to accelerate combustion rates. Even small quantities of nickel, chromium and the platinum metals which are known to aid dehydrogenation of organic compounds are useful.

Also it is to be borne in mind, especially in connection with the following examples, that while the total halogen content of the fluorine donor compound and the metal content of the fluorine acceptor compound (at least one of which is an organo-compound) are generally desired to be in stoichiometric proportions to form the metal halide for producing maximum heat output from the combined ingredients, and are so set forth in the illustrative examples, such proportions may be varied from this stoichiometric relationship, when one or the other of the components is to be employed in excess to afford a desired balance between the heat of combustion and the volume and mass of the products from the combustion.

Procedures employed for combining the components of the fuel in the following examples One skilled in the art will understand that since the examples herein are of energy rich systems, the components therein employed must be combined judiciously, bearing in mind the ignition temperatures and flame propagation rates of the particular combinations being made.

In large scale practice, of course, the liquid-liquid systems are combined by pumping at metered rates to the zone of combustion, and even in the case of self-igniting systems, where the initial conditions at the combustion zone are such that a possibility of delayed ignition is presented, then provision should be made for positive ignition as soon as the introduction of the components is commenced, as by hot wire or otherwise.

In laboratory practice, in combining liquid-liquid components which are self igniting, such combinations are made by pouring together by remote control, or by breaking a container of one of the components in a container of the other, the whole being suitably protected, or, where one or more of the components is a liquified gas, by valving the same through tubes to the zone of combustion, and these practices were followed in the laboratory practice of the present invention.

In the solid systems having relatively high ignition temperatures, in many instances powders of the several components were intimately mixed and then pressed to form a fabricated charge. When the fluorine donor was elastomeric and metal or solid metal hydride was employed as the fluorine acceptor, the metal or metal hydride in finely divided form was milled into the elastomer; when in such combination an oxygen containing oxidant was also employed, such was milled into a separate portion of the fluorine containing elastomer and this combination was then milled into the metal or metal hydride powder-containing portion. In some examples employing solid or elastomeric materials such materials in thin sheets were stacked alternately on one another, with or without subsequent pressing, and this procedure can be employed in all of the solid-solid examples with the qualification that if such examples are self-igniting at normal atmospheric conditions, the superimposed sheets are insulated from one another by insulating sheet material such as aluminum foil. When not preassociated in any of the above ways, the solid materials as powders, sheets, rods, etc., may be mechanically fed to the combustion zone. Generally, however, because of the oxidative stability of the organo-fluorine compounds and the general high temperature stability of the organo-fluorine compounds with the fluorine acceptor metallo-compounds set forth herein, these materials may be prefabricated as solid charges. Thus this invention affords a means of preparing solid fuel combinations of fluoro-compounds and fluorine acceptors with and without oxygen containing oxidants having greater thermal stability than conventional solid fuel systems prepared from hydrocarbon polymers and solid oxidants, even though the new fuels are more energy rich than such conventional solid fuels.

*Ignition procedures*

In many of the liquid-liquid systems the materials spontaneously ignite on contact thereof, it is desirable to have a hot wire or other suitable ignitor located in the combustion zone to insure against delayed ignition.

In the case of the solid systems of this invention, even though many of them ignite only at elevated temperatures, in all cases ignition is easily affected by an electrically heated wire or other igniter contacting the material. Also such wire may melt an insulating foil.

EXAMPLES 1–18

Examples of the preparation of liquid-liquid fuel combinations comprising a liquid or liquifiable inorganic fluorine donor compound illustrative of Class I (a)(1) above, and a fluorine acceptor metallo-material selected from the liquid organo-metallic compounds illustrative of Class II (b)(1) above, are set forth in Table A:

TABLE A

| Ex. No. | Fluorine donor | | Fluorine acceptor | |
|---|---|---|---|---|
| | Moles | Compound | Moles | Compound |
| 1 | 1 | Fluorine (F$_2$) | 2 | Lithium isopropyl. |
| 2 | 1 | Chlorine trifluoride | 4 | Do. |
| 3 | 1 | Bromine pentafluoride. | 6 | Do. |
| 4 | 1 | Fluorine | 1 | Beryllium diethyl. |
| 5 | 1 | Chlorine trifluoride | 2 | Do. |
| 6 | 1 | Bromine pentafluoride. | 3 | Do. |
| 7 | 1 | Fluorine | 1 | Zinc diethyl. |
| 8 | 1 | Chlorine trifluoride | 2 | Do. |
| 9 | 1 | Bromine pentafluoride. | 3 | Do. |
| 10 | 1 | Fluorine | 1 | Cadmium dimethyl. |
| 11 | 1 | Chlorine trifluoride | 2 | Do. |
| 12 | 1 | Bromine pentafluoride. | 3 | Do. |
| 13 | 3 | Fluorine | 2 | Boron trimethyl. |
| 14 | 3 | Chlorine trifluoride | 4 | Do. |
| 15 | 1 | Bromine pentafluoride. | 2 | Do. |
| 16 | 3 | Fluorine | 2 | Aluminum trimethyl. |
| 17 | 3 | Chlorine trifluoride | 4 | Do. |
| 18 | 1 | Bromine pentafluoride. | 2 | Do. |

EXAMPLES 19–28

Example of the preparation of liquid-liquid fuel combinations comprising a liquid or liquifiable inorganic fluorine donor compound illustrative of Class I (a)(2) above, and a fluorine acceptor metallo-material selected from the liquid organo-metallic compounds illustrative of Class II (b)(1) above, are set forth in Table B:

TABLE B

| Ex. No. | Fluorine donor | | Fluorine acceptor | |
|---|---|---|---|---|
| | Moles | Compound | Moles | Compound |
| 19 | 1 | Oxygen difluoride | 2 | Lithium n-propyl. |
| 20 | 1 | do | 1 | Beryllium diethyl. |
| 21 | 1 | do | 1 | Zinc diethyl. |
| 22 | 1 | do | 1 | Cadmium diethyl. |
| 23 | 3 | Dioxygen difluoride | 2 | Boron trimethyl. |
| 24 | 3 | Fluorine perchlorate | 2 | Do. |
| 25 | 3 | Oxygen difluoride | 2 | Do. |
| 26 | 3 | Oxygen difluoride | 2 | Aluminum trimethyl. |
| 27 | 3 | Dioxygen difluoride | 2 | Do. |
| 28 | 3 | Fluorine perchlorate | 2 | Do. |

EXAMPLES 29–38

Examples of the preparation of liquid-solid fuel combinations comprising a liquid or liquifiable inorganic fluorine donor compound illustrative of Class I (a)(2) above and a fluorine acceptor metallo-material selected from the solid mono-metallated, non-polymeric organo-metallic compound illustrative of Class II (b)(2)(i) above, are set forth in Table C:

TABLE C

| Ex. No. | Fluorine donor | | Fluorine acceptor | |
|---|---|---|---|---|
| | Moles | Compound | Moles | Compound |
| 29 | 1 | Fluorine (F$_2$) | 2 | Lithium methyl. |
| 30 | 1 | Chlorine trifluoride | 4 | Do. |
| 31 | 1 | Bromine pentaflurodie. | 6 | Sodium methyl. |
| 32 | 1 | Fluorine | 1 | Beryllium dimethyl. |
| 33 | 1 | Bromine pentafluoride. | 3 | Do. |
| 34 | 1 | Fluorine | 1 | Magnesium dimethyl. |
| 35 | 1 | Bromine pentafluoride. | 3 | Do. |
| 36 | 1 | Chlorine trifluoride | 1 | Lithium boron trimehtyl ethyl. |
| 37 | 1 | do | 1 | Lithium boron trimethyl amide. |
| 38 | 1 | do | 1 | Lithium aluminum tetraethyl. |

EXAMPLES 39–49

Examples of the preparation of liquid-solid fuel combinations comprising a liquid or liquifiable inorganic fluorine donor compound illustrative of Class I (a)(2) above and a fluorine acceptor metallo-material selected from the solid mono-metallated non-polymeric organo-metallic compounds illustrative of Class II (b)(2)(i) above, are set forth in Table D:

TABLE D

| Ex. No. | Fluorine donor | | Fluorine acceptor | |
|---|---|---|---|---|
| | Moles | Compound | Moles | Compound |
| 39 | 1 | Oxygen difluoride | 2 | Lithium methyl. |
| 40 | 1 | Dioxygen difluoride | 2 | Do. |
| 41 | 1 | Fluorine perchlorate | 2 | Do. |
| 42 | 1 | Oxygen difluoride | 2 | Sodium methyl. |
| 43 | 1+2 | Fluorine perchlorate +oxygen difluoride. | 3 | Dilithium acetylide. |
| 44 | 1 | Oxygen difluoride | 1 | Beryllium dimethyl. |
| 45 | 1 | do | 1 | Magnesium dimethyl. |
| 46 | 1 | Dioxygen difluoride | 1 | Dilithium acetylide. |
| 47 | 2 | Oxygen difluoride | 1 | Lithium boron trimethyl ethyl. |
| 48 | 2 | do | 1 | Sodium boron trimethyl amide. |
| 49 | 2 | do | 1 | Lithium aluminum tetraethyl. |

EXAMPLES 50–54

Illustrative examples of the preparation of liquid-solid fuel combinations comprising a liquid or liquifiable inorganic fluorine donor compound illustrative of Class I (a)(1) above, and a fluorine acceptor metallo-material selected from the solid multiply metallated organo-metallic compounds illustrative of Class II (b)(2)(ii) above, are set forth in Table E:

TABLE E

| Ex. No. | Fluorine donor | | Fluorine acceptor | |
|---|---|---|---|---|
| | Moles | Compound | Moles | Compound |
| 50 | 1 | Fluorine (F$_2$) | 1 | Disodium p-xylene. |
| 51 | 1 | Chlorine trifluoride | 2 | Do. |
| 52 | 1 | ___do___ | 2 | Disodium dibenzfuran. |
| 53 | 1 | Fluorine | 1 | Do. |
| 54 | 1 | Bromine pentafluoride. | 2 | Trisodium α-methylstyrene trimer.[1] |

[1] Polymer.

EXAMPLES 55–58

Illustrative examples of the preparation of liquid-solid fuel combinations comprising a liquid or liquifiable inorganic fluorine donor compound illustrative of Class I (a)(2) above, and a fluorine acceptor metallo-material selected from the solid multiply metallated organo-metallic compounds illustrative of Class II (b)(2)(ii) above, are included in Table F.

TABLE F

| Ex. No. | Fluorine donor | | Fluorine acceptor | |
|---|---|---|---|---|
| | Moles | Compound | Moles | Compound |
| 55 | 1 | Fluorine perchlorate | 1 | Disodium p-xylene. |
| 56 | 1 | Oxygen difluoride | 1 | Do. |
| 57 | 1 | ___do___ | 1 | Disodium dibenzfuran. |
| 58 | 3 | ___do___ | 2 | Trisodium α-methyl styrene.[1] |

[1] Polymer.

EXAMPLES 59–70

Examples of the preparation of liquid-solid fuel combinations comprising a liquid organo-fluorine donor compound illustrative of Class I (b)(1) above, and a fluorine acceptor selected from the metals per se illustrative of Class II (a)(1) above, are set forth in Table G.

TABLE G

| Ex. No. | Fluorine donor | | Fluorine acceptor | |
|---|---|---|---|---|
| | Moles | Compound | Moles | Compound |
| 59 | 1 | Perfluoromethane | 4 | Lithium. |
| 60 | 1 | Perfluoroethane | 6 | Sodium. |
| 61 | 1 | Perfluoroethylene | 4 | Potassium. |
| 62 | 1 | Perfluoropropylene | 3 | Beryllium. |
| 63 | 1 | Chlorotrifluoromethane. | 2 | Magnesium. |
| 64 | 1 | Chlorotrifluoroethylene. | 2 | Calcium. |
| 65 | 1 | Vinylidene fluoride | 2 | Boron. |
| 66 | 1 | C$_6$F$_{13}$(CH$_2$CF$_2$)$_2$I | 6 | Aluminum. |
| 67 | 2 | IC$_2$H$_4$C$_4$F$_8$C$_2$H$_4$I | 5 | Titanium. |
| 68 | 1 | CHF$_2$C$_4$F$_8$—OH | 2 | Vanadium. |
| 69 | 1 | CF$_2$CCF$_3$COOC$_2$F$_5$ | 2 | Fe-V alloy (90%V). |
| 70 | 4 | CF$_3$NO | 3 | LiAl alloy. |

EXAMPLES 71–77

Illustrative examples of the preparation of liquid-solid fuel combinations comprising a liquid organo-fluorine donor compound illustrative of Class I (b)(1) above, and a fluorine acceptor selected from the metal-nitrogen containing compounds illustrative of Class II (a)(2) above, are set forth in Table H.

TABLE H

| Ex. No. | Fluorine donor | | Fluorine acceptor | |
|---|---|---|---|---|
| | Moles | Compound | Moles | Compound |
| 71 | 3 | Perfluoroisobutylene | 8 | Lithium nitride. |
| 72 | 1 | Vinylidene fluoride | 2 | Lithium amide. |
| 73 | 1 | Perfluoroethylene | 4 | Sodium amide. |
| 74 | 1 | Trifluorochloroethylene. | 4 | Sodium azide. |
| 75 | 3 | Perfluorobutyliodide | 10 | Sodium nitride. |
| 76 | 1 | CHF$_2$C$_6$F$_{12}$—OH | 14 | Potassium amide. |
| 77 | 1 | Trifluoronitrosomethane. | 3 | Lithium amide. |

EXAMPLES 78–87

Examples of the preparation of liquid-liquid fuel combinations comprising a liquid organo-fluorine donor compound illustrative of Class I (b)(1) above, and a fluorine acceptor selected from the liquid or liquifiable metal hydrides illustrative of Class II (a)(3)(i) above, as set forth in Table I.

TABLE I

| Ex. No. | Fluorine donor | | Fluorine acceptor | |
|---|---|---|---|---|
| | Moles | Compound | Moles | Compound |
| 78 | 3 | Perfluoromethane | 2 | Diborane. |
| 79 | 1 | Perfluoroethane | 1 | Do. |
| 80 | 3 | Perfluoroethylene | 2 | Do. |
| 81 | 5 | Perfluoroisopropylene | 2 | Pentaborane. |
| 82 | 15 | Chlorotrifluoromethane. | 4 | Pentaborane. |
| 83 | 15 | Monochlorotrifluoroethylene. | 4 | Do. |
| 84 | 6 | Vinylidene fluoride | 1 | Aluminum borohydride. |
| 85 | 2 | Perfluoropropylene | 1 | Do. |
| 86 | 6 | Perfluorobutane | 5 | Do. |
| 97 | 4 | Trifluoronitrosomethane. | 1 | Do. |

EXAMPLES 88–93

Examples of the preparation of liquid-solid fuel combinations comprising a liquid organo-fluorine donor compound illustrative of Class I (b)(1) above, and a fluorine acceptor selected from the solid metal hydrides illustrative of Class II (a)(3)(ii) above, are included in Table J.

TABLE J

| Ex. No. | Fluorine donor | | Fluorine acceptor | |
|---|---|---|---|---|
| | Moles | Compound | Moles | Compound |
| 88 | 1 | Perfluoromethane | 4 | Lithium hydride. |
| 89 | 1 | Trifluorochloroethane | 1 | Lithium borohydride. |
| 90 | 1 | Trifluorochloroethylene. | 1 | Sodium borohydride. |
| 91 | 1 | Perfluoroethylene | 1 | Lithium aluminum hydride. |
| 92 | 15 | Vinylidenefluoride | 1 | Decaborane. |
| 93 | 1 | Perfluoroisobutylene | 4 | Calcium hydride. |

EXAMPLES 94–106

Examples of the preparation of liquid-liquid fuel combinations comprising a liquid organo fluorine donor compound illustrative of Class I(b)(1) above, and a fluorine acceptor selected from the liquid organometallic compounds illustrative of Class II(b)(1) above, are set forth in Table K:

TABLE K

| Ex. No. | Fluorine donor | | Fluorine acceptor | |
|---|---|---|---|---|
| | Moles | Compound | Moles | Compound |
| 94 | 1 | Perfluoromethane | 4 | Lithium propyl. |
| 95 | 1 | Trifluorochloroethane | 4 | Do. |
| 96 | 1 | Perfluoroethylene | 4 | Do. |
| 97 | 1 | Vinylidene fluoride | 2 | Do. |
| 98 | 1 | Perfluorohexyliodide | 7 | Beryllium dimethyl. |
| 99 | 1 | Perfluorobutyldiiodide-1,4. | 5 | Do. |
| 100 | 1 | $C_6F_{13}(CH_2CF_2)_2I$ | 9 | Do. |
| 101 | 1 | $I(C_2H_4)C_4F_8)C_2H_4)I$ | 5 | Do. |
| 102 | 3 | Perfluorobutane | 10 | Aluminum trimethyl. |
| 103 | 1 | Perfluoroisobutylene | 2 | Do. |
| 104 | 1 | Perfluorobutanol | 3 | Do. |
| 105 | 3 | $CHF_2C_4F_8$—OH | 10 | Do. |
| 106 | 1 | $CF_2CCF_3COOC_3F_7$ | 4 | Do. |

EXAMPLES 107–118

Examples of the preparation of liquid-solid fuel combinations comprising a liquid organo-fluorine donor compound illustrative of the Class I(b)(1) above, and a fluorine acceptor selected from the solid mono-metallated organo-metallic compounds illustrative of Class II (b)(2)(i) above, are set forth in Table L:

TABLE L

| Ex. No. | Fluorine donor | | Fluorine acceptor | |
|---|---|---|---|---|
| | Moles | Compound | Moles | Compound |
| 107 | 1 | Perfluoropropylene | 6 | Lithium methyl. |
| 108 | 1 | Perfluorobutane | 10 | Sodium ethyl. |
| 109 | 1 | Perfluoropentane | 12 | Sodium butyl. |
| 110 | 1 | Perfluorohexyliodide | 14 | Potassium ethyl. |
| 111 | 1 | $C_6F_{13}(CH_2CF_2)_4I$ | 11 | Berylliumdimethyl. |
| 112 | 10 | $CHF_2C_4F_8$—OH | 5 | Magnesiumdiethyl. |
| 113 | 1 | Perfluoromethane | 4 | Lithium methyl. |
| 114 | 1 | Dichloro-difluoro-ethylene. | 2 | Zinc dimethyl. |
| 115 | 1 | Chlorotrifluoroethylene. | 4 | Sodium methyl. |
| 116 | 1 | Perfluoroethylene | 1 | Lithiumaluminum tetraethyl. |
| 117 | 1 | Perfluoropropane | 2 | Do. |
| 118 | 2 | Perfluorobutane | 5 | Do. |

EXAMPLES 119–123

Typical examples of the preparation of liquid-liquid fuel combinations comprising a liquid organo fluorine donor compound illustrative of Class I (b)(1) above, and a fluorine acceptor selected from the solid multiply metallated organo-metallic compounds illustrative of Class II (b)(2)(ii) above, are set forth in Table M:

TABLE M

| Ex. No. | Fluorine donor | | Fluorine acceptor | |
|---|---|---|---|---|
| | Moles | Compound | Moles | Compound |
| 119 | 1 | Perfluoroethylene | 2 | Disodium p-xylene. |
| 120 | 1 | Chlorotrifluoroethylene. | 2 | Do. |
| 121 | 1 | Vinylidenefluoride | 1 | Disodium dibenzofuran. |
| 122 | 1 | Perfluoropropylene | 3 | Do. |
| 123 | 1 | do | 2 | Trisodium a-methylstyrene trimer.[1] |

[1] Polymeric.

In Examples 124–177 polymers, copolymers mixed polymers and grat copolymers, from fluorinated monomers containing polymerizable carbon-to-carbon unsaturation were employed as typical of fluorine containing polymers generally, since the invention in its broader aspects is not limited to any particular fluorinated polymer.

Fluorinated polymers presently commercially available are the perfluorinated ethylene polymers (Du Pont's "Teflon" polymers), the chlorotrifluoroethylene polymers (Minnesota Minings' "Kel-F" polymers and Hooker Electrochemical Company's "Fluorolubs"), and perfluoropropylene/vinylidene fluoride copolymers (Du Pont's "Viton" polymers). Other known fluorine-containing polymers include those produced by condensation of a polycarboxyl compound with a polyalcohol or a polyamine, at least one of which is partially or completely fluorinated and these also may be employed together with or in lieu of those employed in the examples given, since the present invention is not dependent on any particular method of preparation of the fluorine donor polymer.

It is known that the ratios of the monomers employed to prepare fluorinated copolymers can be widely varied, and it will be evident to one skilled in the art that for a given ratio of monomers in a given copolymer, there is a stoichiometric ratio of metal acceptor compound to the halide content of the particular donor copolymer, which will produce maximum formation of metal halide and maximum heat generation. Therefore in these examples the polymer compositions have been set out as the molar ratio of the monomers employed in forming the particular copolymer used in the example.

EXAMPLES 124–137

Typical examples of the preparation of solid-solid fuel combination comprising a polymeric organo-fluorine donor compound illustrative of Class I (b)(2) above, and a fluorine acceptor selected from the metals per se illustrative of Class II (a)(1) above, are set forth in Table N:

TABLE N

| Ex. No. | Polymeric fluorine donor | | Fluorine acceptor | |
|---|---|---|---|---|
| | Moles | Monomer | Moles | Compound |
| 124 | 1 | Perfluoroethylene | 4 | Lithium. |
| 125 | 1+1 | Perfluorethylene+vinyl fluoride. | 5 | Do. |
| 126 | 1+1 | Perfluoroethylene+vinylidene fluoride. | 6 | Sodium. |
| 127 | 1+2 | Perfluoroethylene+trifluorochloroethylene. | 12 | Potassium. |
| 128 | 1+3 | Perfluoroethylene+perfluoropropylene. | 11 | Beryllium. |
| 129 | 1 | Trifluorochloroethylene | 2 | Magnesium. |
| 130 | 1+2+1 | Trifluorochloroethylene+Vinyl fluoride+vinylidene fluoride. | 4 | Do. |
| 131 | 1 | Vinylidene fluoride | 1 | Do. |
| 132 | 2+1 | Trifluorochloroethylene+vinylidene fluoride. | 5 | Do. |
| 133 | 1+1 | Trifluorochloroethylene+perfluoropropylene. | 5 | Calcium. |
| 134 | 1 | Perfluoropropylene | 2 | Boron. |
| 135 | 1+3 | Perfluoropropylene+vinyl fluoride. | 3 | Aluminum. |
| 136 | 1+1 | Perfluoropropylene+vinylidene fluoride. | 2 | Titanium. |
| 137 | 5 | Vinylidene fluoride | 2 | Vanadium. |

EXAMPLES 138–142

Examples of the preparation of solid-solid fuel combinations comprising a polymeric organo-fluorine donor compound illustrative of Class I (b)(2) above, and a fluorine acceptor selected from the metal-nitrogen containing compounds illustrative of Class II (a)(2) above, are set forth in Table O:

TABLE O

| Ex. No. | Polymeric fluorine donor | | Fluorine acceptor | |
|---|---|---|---|---|
| | Moles | Monomer | Moles | Compound |
| 138 | 3 | Perfluoroethylene | 4 | Lithium nitride. |
| 139 | 3 | Chlorotrifluorethylene | 4 | Sodium nitride. |
| 140 | 1 | Perfluoropropylene | 6 | Lithium amide. |
| 141 | 1 | Vinylidene fluoride | 2 | Sodium amide. |
| 142 | 2+1 | Perfluoropropylene+vinyl fluoride. | 13 | Sodium azide. |

EXAMPLES 143–147

Examples of the preparation of solid-liquid fuel combinations comprising a polymeric organo-fluorine donor compound illustrative of Class I (b)(2) above, and a fluorine acceptor selected from the liquid or liquifiable metal hydrides illustrative of Class II (a)(3)(i) above, are set forth in Table P:

TABLE P

| Ex. No. | Polymeric fluorine donor | | Fluorine acceptor | |
|---|---|---|---|---|
| | Moles | Monomers | Moles | Compound |
| 143 | 3 | Perfluoroethylene | 2 | Diborane. |
| 144 | 3 | Chlorotrifluoroethylene | 2 | Do. |
| 145 | 15 | Vinylidene fluoride | 2 | Pentaborane. |
| 146 | 5 | Perfluoropropylene | 2 | Do. |
| 147 | 1+3 | Perfluoropropylene+ vinylidene fluoride. | 1 | Aluminum borohydride. |

EXAMPLES 148–152

In Table Q are set forth examples of the preparation of solid-solid fuel combinations comprising a polymeric organo-fluorine donor compound illustrative of Class I (b)(2) above, and a fluorine acceptor selected from the solid metal hydrides illustrative of Class II (a)(3)(ii) above:

TABLE Q

| Ex. No. | Polymeric fluorine donor | | Fluorine acceptor | |
|---|---|---|---|---|
| | Moles | Monomer | Moles | Compound |
| 148 | 1 | Vinylidene fluoride | 2 | Lithium hydride. |
| 149 | 1 | Chlorotrifluorethylene | 1 | Lithium borohydride. |
| 150 | 2 | Perfluoropropylene | 3 | Lithium aluminum hydride. |
| 151 | 1 | Perfluoroethylene | 2 | Calcium hydride. |
| 152 | 7+1 | Perfluoroethylene+ vinylidene fluoride. | 1 | Decaborane. |

EXAMPLES 153–160

Table R summarizes illustrative examples of the preparation of solid-liquid fuel combinations comprising a polymeric organo fluorine donor compound illustrative of Class I (b)(2) above, and a fluorine acceptor selected from the liquid organo-metallic compounds illustrative of Class II (b)(1) above, as set forth in Table R:

TABLE R

| Ex. No. | Polymeric fluorine donor | | Fluorine acceptor | |
|---|---|---|---|---|
| | Moles | Monomer | Moles | Compound |
| 153 | 1 | Vinylidene fluoride | 2 | Lithium propyl. |
| 154 | 1 | Perfluoroethylene | 4 | Do. |
| 155 | 1 | Chlorotrifluoroethylene | 4 | Do. |
| 156 | 1 | Perfluoroethylene | 2 | Beryllium dimethyl. |
| 157 | 1 | Vinylidene fluoride | 1 | Do. |
| 158 | 3 | do | 4 | Aluminum trimethyl. |
| 159 | 1 | Perfluoropropylene | 2 | Do. |
| 160 | 1+3 | Perfluoropropylene+ vinylidene fluoride. | 4 | Do. |

EXAMPLES 161–173

In Table S are set forth illustrative examples of the preparation of solid-solid fuel combinations comprising a polymeric organo fluorine donor compound illustrative of Class I (b)(2) above, and a fluorine acceptor selected from the solid or viscous liquid mono-metallated organometallic compounds illustrative of Class II (b)(2)(i) above:

TABLE S

| Ex. No. | Polymeric fluorine donor | | Fluorine acceptor | |
|---|---|---|---|---|
| | Moles | Monomer | Moles | Compound |
| 161 | 1 | Perfluoroethylene | 4 | Lithium methyl. |
| 162 | 1 | Trifluorochloroethylene. | 4 | Do. |
| 163 | 1 | Difluorodichloroethylene. | 4 | Do. |
| 164 | 1 | Perfluoropropylene | 6 | Sodium ethyl. |
| 165 | 2+1 | Perfluoroethylene+ trifluorochloroethylene. | 12 | Do. |
| 166 | 1+1 | Perfluoroethylene+ vinylidene fluoride. | 6 | Potassium ethyl. |
| 167 | 1+2 | Trifluorochloroethylene+vinylidene fluoride. | 4 | Beryllium dimethyl. |
| 168 | 1+3 | Perfluoropropylene+ perfluoroethylene. | 9 | Magnesium diethyl. |
| 169 | 1+1 | Perfluoropropylene+ trifluorochloroethylene. | 10 | Sodium butyl. |
| 170 | 2+1 | Perfluoropropylene+ vinylidene fluoride. | 14 | Lithium methyl. |
| 171 | 1 | Perfluoroethylacrylate. | 8 | Do. |
| 172 | 1 | Perfluoroethylene | 1 | Lithium aluminum tetraethyl. |

EXAMPLES 173–177

Table T summarizes illustrative examples of the preparation of solid-liquid fuel combinations comprising a polymeric organo fluorine donor compound illustrative of Class I (b)(2) above, and a fluorine acceptor selected from the solid multiply metallated organometallic compounds illustrative of Class II (b)(2)(ii) above:

TABLE T

| Ex. No. | Polymeric fluorine donor | | Fluorine acceptor | |
|---|---|---|---|---|
| | Moles | Monomer | Moles | Compound |
| 173 | 1 | Vinylidene fluoride | 1 | Disodium p-xylene. |
| 174 | 1 | Perfluoroethylene | 2 | Do. |
| 175 | 1 | Chlorotrifluoroethylene. | 2 | Disodium dibenzofuran. |
| 176 | 1 | Vinylidene fluoride | 1 | Do. |
| 177 | 3 | do | 2 | Trisodium α-methyl styrene trimer.* |

*Polymeric.

EXAMPLES 178–190

All of the Examples 1–177 except Examples 43 and 46 produce free carbon or free hydrogen and carbon, and this is true even of those in Tables B, D, and F, in which the fluorine donor compound contains oxygen with the two exceptions noted since such oxygen content is not in any other instance sufficient to combine with all of the hydrogen and/or carbon, freed by the production of metal halide from the reactants, to form water and carbon monoxide.

When burning in the open, the freed carbon was often evidenced by the production of black smoke. Other examples showing the variation in observed results are set forth in Table U, which also illustrates the fact that the invention is not limited to the employment of stoichiometric proportions:

fore to be understood that the exemplary embodiments are illustrative and not restrictive of the invention, the

TABLE U

| Example No. | Mole | Fluorine donor | Fluorine acceptor | Mols | Ignition | Remarks |
|---|---|---|---|---|---|---|
| 178 | 0.01 | Perfluorohexyliodide | Lithium amyl | 0.07 | Spontaneous | Burned with white smoke, carbon residue. |
| 179 | 0.01 | 1,4-diiodooctafluorobutane | do | 0.07 | do | Do. |
| 180 | [1] 0.01 | Fluorolube S-30 | do | 0.02 | do | Violent burning with detonation. |
| 181 | 0.01 | do | Lithium hydride | 0.10 | Hot wire | Burned violently, white smoke. |
| 182 | [1] 0.1 | Fluorolube HO-125 | do | 0.2 | do | Burned vigorously, black smoke. |
| 183 | 0.1 | do | do | 0.4 | do | Do. |
| 184 | [2] 0.1 | Teflon powder | do | 0.2 | do | Burning vigorously, black smoke. |
| 185 | [1] 0.1 | Fluorolube HO-125 | Magnesium powder | 0.2 | do | Burned vigorously, black smoke. |
| 186 | [2] 0.04 | Teflon powder | Vanadium powder | 0.10 | do | Burned freely. |
| 187 | 80 (g.) | do | Ferro-titanium alloy powder (28% T.), g. | 40 | Magnesium powder | Burned with white smoke. |
| 188 | ([3]) | Perchloryl fluoride | Amyl zinc, ml | 25 | Spontaneous | Burned with bright flame, white smoke. |
| 189 | [2] 125 (g.) | Teflon powder | {Aluminum metal, g.<br>{+lithium hydride, g. | 9.0<br>32 | }Hot wire | Bright hot flame, fast combustion, black smoke at start. |
| 190 | 31 (g.) | Viton A | {Lithium hydride, g.<br>{+aluminum metal, g. | [4] 9<br>44 | }Direct flame | Rapid burning, black smoke at start, no residue. |

[1] Based on chlorotrifluoroethylene.
[2] Based on tetrafluoroethylene.
[3] Stream of perchloryl fluoride blown through copper pipe cautiously onto surface of liquid amyl zinc.
[4] Sheeted on rubber mill.

EXAMPLES 191–203

In accordance with the second broad aspect of the present invention, the formation of free carbon or of free hydrogen and carbon, can be controlled by adding to the fuel combination an oxygen containing oxidant sufficient to oxidize part or all of the freed carbon to carbon monoxide (and the freed hydrogen if present), this producing further gaseous products of combustion, a factor to be considered in fuel uses other than those requiring a maximum ratio of heat output to weight of reactants, for which uses the oxygen containing oxidant ordinarily is not employed. The employment of the oxygen containing oxidant with certain fuel combinations is herein set forth in detail in Table V, Examples 191–203, from which it will be clear that by applying the same principles any of the fuels exemplified in Examples 1–190 may be similarly modified with any of the oxygen containing oxidants set forth under heading III above, and that with the liquid-liquid systems in these examples, it is usually preferable to employ the liquid or liquifiable gaseous oxidants set forth under heading III (a) and for the solid systems, the solid oxidants set forth under heading III (b) above.

scope of which is defined in the appended claims, and that all modifications that come within the meaning and range of equivalency of the claims are intended to be included therein.

As used in the appended claims, the term "fluorine donor material" designates material comprising fluorine and capable of supplying the fluorine to take part in the combustion with the fluorine acceptor material; the term "fluorine acceptor material" designates fuel material capable of exothermally combining with the fluorine supplied by the fluorine donor material; the term "oxygen containing oxidizer" designates oxygen containing material, hereinbefore called "oxidant," which is capable of supplying oxygen to take part in the combustion of oxidizable material freed incident to the reaction of the fluorine acceptor material with the fluorine from the fluorine donor material; the term "at least roughly equivalent" refers to the fact that the fluorine acceptor material will generally be employed in approximate molar ratio to fluorine supplied by the fluorine donor material, but in connection with such term it is to be borne in mind that the invention is not limited to the employment of stoichi-

TABLE V

| Example No. | Mols | Fluorine donor | Fluorine acceptor | Mols | Oxidant | Mols |
|---|---|---|---|---|---|---|
| 191 | [1] 0.1 | Fluorolube S-30 | Magnesium metal | 0.4 | Lithium perchlorate | 0.05 |
| 192 | [1] 0.1 | do | do | 0.4 | Ammonium nitrate | 0.2 |
| 193 | [1] 0.3 | do | Aluminum metal | 0.4 | Lithium perchlorate | 0.15 |
| 194 | [1] 0.3 | do | do | 0.4 | Ammonium nitrate | 0.6 |
| 195 | [1] 0.1 | KEL-F | Titanium metal | 0.1 | Lithium perchlorate | 0.05 |
| 196 | [1] 0.1 | do | do | 0.1 | Ammonium nitrate | 0.2 |
| 197 | [2] 0.5 | Teflon | Vanadium metal | 0.4 | Lithium perchlorate | 0.25 |
| 198 | [2] 0.5 | do | do | 0.4 | Ammonium perchlorate | 0.5 |
| 199 | [2] 0.2 | do | Lithium hydride | 0.4 | Lithium perchlorate | 0.1 |
| 200 [4] | [2] 0.1 | do | Lithium methyl | 0.4 | do | 0.3 |
| 201 [4] | [2] 0.1 | do | Beryllium dimethyl | 0.2 | Ammonium perchlorate | 0.6 |
| 202 | [3] 0.1 | Viton A | {Lithium hydride<br>{+aluminum metal | 0.3<br>0.1 | Lithium perchlorate<br>+ammonium nitrate | 0.0<br>0.15 |
| 203 | 0.3 | Oxygen difluoride | Boron trimethyl | 0.2 | Nitrogen tetroxide | 0.2 |

[1] Based on chlorotrifluoroethylene.
[2] Based on tetrafluoroethylene.
[3] Based on perfluoropropylene; because this polymer contains some vinylidene fluoride for a stoichiometric balance the fluorine acceptor is in slightly more and the oxidant slightly less than stoichiometric balance.
[4] The organo-metallic compound is mixed with half of the Teflon and the oxidant with the other half, and the two parts are assembled in layers separated by aluminum foil to form sandwich, with hot wire ignition.

While there have been described herein what are at present considered preferred embodiments of the invention, it will be obvious to those skilled in the art that minor modifications and changes may be made without departing from the essence of the invention. It is thereometric proportions, and contemplates variations as referred to in part IV of the foregoing general description.

We claim:

1. A high energy fuel composition consisting essentially of a system of reactants adapted to undergo rapid combustion, said system having as its predominant exothermal reactants metal as fuel element and fluorine as oxidizing element, said system characterized in that said oxidizing element prior to combustion of the system is present in the system as material selected from Class (I) as hereinafter defined, and in that said fuel element prior to combustion of the system is present in the system as material selected from Class (II) as hereinafter defined with the limitation that at least the predominant portion of said oxidizing element is made up of material selected from group I(b) and in that the halogen content and metal content of said predominant reactants are present in the system in approximately stoichiometric proportions to form metal halide; said class (I) consisting of group I(a) fluorine itself, the compounds of fluorine with other halogens, the oxygen compounds of the foregoing, the nitrogen compounds of the foregoing, and mixtures of the foregoing; group I(b) the organic compounds of fluorine consisting principally of fluorine and carbon, and mixtures thereof; and group I(c) mixtures of materials selected from group I(a) with material selected from group I(b); and said Class (II) consisting of group II(a) the metals, and mixtures and alloys thereof in attenuated form; group II(b) the organo-metallic-compounds and mixtures thereof; group II(c) the metal hydrides and metal-nitrogen compounds and mixtures thereof; and group II(d) mixtures of at least two materials selected from different ones of said groups II(a), II(b) and II(c); said system further characterized in that at least a substantial part of said fuel element is selected from said group II(a) and at least a further substantial part of said fuel element is selected from said group II(b).

2. A high energy fuel composition according to claim 1, in which said group II(b) material is in liquid form.

3. A high energy fuel composition according to claim 1, in which said group II(b) material is in solid form.

4. A process of generating energy which comprises burning in a combustion chamber a fuel system according to claim 1.

5. A composition adapted to undergo rapid combustion comprising about 5.9% boron and the remainder ammonium perchlorate and polytrifluorochloroethylene in substantially equal amounts.

6. A composition adapted to undergo rapid combustion comprising:
(a) about 5.9% boron,
(b) about 46.7% poly-trifluorochloroethylene, and
(c) about 47.4% ammonium perchlorate.

7. A composition adapted to undergo rapid combustion comprising essentially:
(a) fuel consisting essentially of boron,
(b) polytrifluorochloroethylene, and
(c) ammonium perchlorate,
(d) the halogen content of said polytrifluorochloroethylene and the metal content of said composition being about in stoichiometric proportions to form metal halide.

8. A composition adapted to undergo rapid combustion comprising essentially:
(a) fuel consisting essentially of boron,
(b) polytrifluorochloroethylene, and
(c) ammonium perchlorate.
(d) the halogen content of said polytrifluorochloroethylene and the metal content of said composition being about in stoichiometric proportion to form metal halide, and
(e) the ammonium perchlorate being present in sufficient amount to oxidize the carbon content of said polytrifluorochloroethylene.

9. A composition adapted to undergo rapid combustion comprising essentially:
(a) fuel consisting essentially of metal,
(b) halocarbon polymer the halogen of which consists at least predominantly of fluorine, and
(c) ammonium perchlorate,
(d) the halogen content of said halocarbon polymer and the metal content of said composition being about in stoichiometric proportion to form metal halide, and
(e) the ammonium perchlorate being present in sufficient amount to oxidize the carbon content of said halocarbon polymer.

References Cited by the Examiner
UNITED STATES PATENTS

| 2,400,091 | 5/46 | Alfthan | 18—47.5 |
| 2,689,380 | 9/54 | Tait | 18—59 |
| 2,900,242 | 8/59 | Williams et al. | 149—22 |
| 2,942,116 | 6/60 | Axelrad | 250—108 |
| 2,944,881 | 7/60 | Ruskin. | |
| 2,970,898 | 2/61 | Fox | 149—19 XR |
| 2,995,826 | 8/61 | De Ment | 149—22 XR |
| 3,010,815 | 11/61 | Fierce et al. | 149—22 |

OTHER REFERENCES

Bowman et al.: "The Journal of Space Flight," vol. 2, No. 1, January 1950, pp. 6–9.

Carpentar: "Ind. and Eng. Chem.," vol. 49, No. 4, April 1957, pp. 42A–48A.

Chem. and Eng. News, May 27, 1957, pp. 18–23.

Leonard: "Journal American Rocket Soc.," vol. 72, December 1947, pp. 10–23.

Penner: "Journal of Chemical Education," January 1952, pp. 37–8.

CARL D. QUARFORTH, *Primary Examiner.*

LEON D. ROSDOL, *Examiner.*